United States Patent [19]

Noguchi et al.

[11] Patent Number: 4,594,296

[45] Date of Patent: Jun. 10, 1986

[54] MAGNETIC RECORDING MEDIUM

[75] Inventors: Kiyoshi Noguchi; Kouji Kobayashi; Suguru Takayama, all of Tokyo, Japan

[73] Assignee: TDK Corporation, Tokyo, Japan

[21] Appl. No.: 562,071

[22] Filed: Dec. 16, 1983

[30] Foreign Application Priority Data

Dec. 25, 1982 [JP] Japan ................................. 57-234813

[51] Int. Cl.$^4$ ............................................... G11B 5/66
[52] U.S. Cl. ..................................... 428/610; 428/611; 428/668; 428/928; 360/134
[58] Field of Search .............. 428/611, 928, 678, 547, 428/548, 610, 593, 668; 360/134, 135

[56] References Cited

U.S. PATENT DOCUMENTS

| | | | |
|---|---|---|---|
| 4,124,736 | 11/1978 | Patel et al. | 428/632 |
| 4,162,350 | 7/1979 | Yanagisawa et al. | 428/633 |
| 4,293,621 | 10/1981 | Togami | 428/928 |
| 4,307,156 | 12/1981 | Yanagisawa | 428/633 |
| 4,323,629 | 4/1982 | Kunieda et al. | 428/928 |
| 4,371,590 | 2/1983 | Izumi et al. | 428/928 |
| 4,385,098 | 5/1983 | Sugita et al. | 428/928 |
| 4,387,136 | 6/1983 | Saito et al. | 360/134 |
| 4,410,583 | 10/1983 | Hanaoka | 428/928 |
| 4,418,126 | 11/1983 | Izumi et al. | 360/134 |

FOREIGN PATENT DOCUMENTS 118321  9/1981  Japan ............................ 204/192 M Primary Examiner—L. Dewayne Rutledge
Assistant Examiner—John J. Zimmerman
Attorney, Agent, or Firm—Oblon, Fisher, Spivak, McClelland & Maier

[57] ABSTRACT

A magnetic recording medium which comprises a magnetic layer formed on a substrate and comprising Co, or Co and one to three elements selected from the group consisting of Ni, Cr and O, wherein, when the magnetic layer is divided equally into four portions in the direction of the thickness of the magnetic layer, the density of the portion located farthest from the substrate is greater by at least 20% than the average density of three other portions.

7 Claims, No Drawings

MAGNETIC RECORDING MEDIUM

BACKGROUND OF THE INVENTION

1. Field of the Invention

The present invention relates to a magnetic recording medium, and particularly to a magnetic recording medium having a magnetic layer of a continuous thin film type formed by a so-called oblique vapor deposition.

2. Description of the Prior Art

In order to attain compact winding of video and audio recording tapes, there have been active researches to develop a magnetic recording medium having a magnetic layer of a continuous thin film type.

As a magnetic layer for such a continuous thin film type medium, a vapor deposited magnetic layer composed of e.g. Co, Co-Ni, Co-O or Co-Ni-O is most suitable from a view point of the desired characteristics, which is formed by a so-called oblique vapor deposition method in which the vapor deposition is conducted at a predetermined inclined angle relative to the normal line of the substrate.

The thin magnetic layer formed by such a oblique vapor deposition method is composed of columnar crystal particles which are inclined relative to the normal line of the principal plane of the substrate and which have a length corresponding to the thickness of the magnetic layer. Co, Ni, etc. are present in the columnar crystal particles, and optionally incorporated O is present in the form of an oxide on the surface of the columnar crystal particles.

However, such a magnetic layer has drawbacks such that it is susceptible to oxidation and its corrosion resistance is poor.

Under the circumstances, there have been proposed various protective layers to be laminated on such a magnetic layer to improve its corrosion resistance.

However, if a protective layer is provided, the electromagnetic conversion characteristics will be impaired, and the output and the S/N ratio will be lowered as a result of an increase of a spacing loss attributable to the protective layer.

SUMMARY OF THE INVENTION

Under these circumstances, it is a primary object of the present invention to improve the corrosion resistance without impairing the electromagnetic convertion characteristics of a magnetic recording medium having a magnetic layer formed by an oblique vapor deposition method, by modifying the structure of the magnetic layer itself without providing a separate protective layer.

Such an object is attained by the following present invention.

Namely, the present invention provides a magnetic recording medium which comprises a magnetic layer formed on a substrate and comprising Co, or Co and one to three elements selected from the group consisting of Ni, Cr and O, wherein, when the magnetic layer is divided equally into four portions in the direction of the thickness of the magnetic layer, the density of the portion located farthest from the substrate is greater by at least 20% than the average density of three other portions.

DETAILED DESCRIPTION OF THE PREFERRED EMBODIMENTS

Now, the present invention will be described in detail with reference to the preferred embodiments.

The magnetic recording medium of the present invention has a magnetic layer on a substrate.

The magnetic layer contains Co as an essential component, and comprises Co, Co+Ni, Co+O or Co+Ni+O.

Namely, the magnetic layer may be composed of Co alone, or it may be composed of Co and Ni. In the case of Co+Ni, the weight ratio of Co/Ni is preferably at least 1.5.

Further, the magnetic layer may contain O in addition to Co or Co+Ni. When O is incorporated, better results will be obtained with respect to the electromagnetic conversion characteristics or running durability.

In such a case, the atomic ratio of O/Co (no Ni is contained) or O/(Co+Ni) is preferably at most 0.2, more preferably from 0.01 to 0.1.

When the magnetic layer contains Cr in addition to Co, Co+Ni, Co+O or Co+Ni+O, still better results are obtainable.

Namely, the electromagnetic conversion characteristics as well as the output and S/N ratio will thereby be improved, and the strength of the layer will also be improved.

In such a case, the weight ratio of Cr/Co (no Ni is contained) or Cr/(Co+Ni) is preferably from 0.001 to 0.1.

In this case, the weight ratio of Cr/Co or Cr/(Co+Ni) is preferably from 0.005 to 0.5, whereby a further improvement will be obtained.

Further, such a magnetic layer may additionally contain a small amount of other components, particularly transition elements such as Fe, Mn, V, Zr, Nb, Ta, Mo, W, Ti, Cu or Zn.

When the magnetic layer having such an overall composition is divided into four portions in the direction of its thickness, the density of the portion located farthest from the substrate is greater by at least 20% than the average value of the densities of the three other portions. In the conventional magnetic layer, the surface portion usually has substantially the same density as other portions. According to the present invention, improvement of corrosion resistance is attainable only when a density gradient or variation is created in the direction of the thickness as mentioned above. Such improvement of the corrosion resistance appears when the density of the surface layer (i.e. ¼ of the total thickness) becomes greater by 20% than the density of other portions.

In this case, the density may be measured in the following manner.

Namely, a sample magnetic layer is subjected to a fluorescent X-ray analysis while etching the magnetic layer by means of a dry process etching means such as ion milling, whereby the count numbers of the constituting elements are measured. Then, the density is obtained from the curve representing the change of the count numbers.

Such a magnetic layer is usually formed to have a thickness of from 0.05 to 0.5 $\mu$m, preferably from 0.07 to 0.3 $\mu$m.

Various layer structures are available to provide the above-mentioned density profile to the magnetic layer.

However, it is usually preferred that the magnetic layer has the following structure.

Namely, it is preferred that the magnetic layer comprises first and second layers, wherein the first layer is formed on a substrate and composed of columnar crystal particles which are inclined relative to the normal line of the principal plane of the substrate, and the second layer is formed on the first layer i.e. on the opposite side of the substrate, and composed of crystal particles which are not inclined relative to the normal line of the principal plane of the substrate. With such a construction, the control can readily be made for the formation of the above-mentioned density profile.

In such a case, the columnar crystal particles of the first layer are preferably inclined at an angle of at least 30° relative to the normal line of the principal plane of the substrate.

Each columnar crystal particle usually has a length corresponding to the thickness of the first layer, and its diameter is usually from 50 to 500 A.

Co and optionally added Ni, Cr, etc. are present in the crystal particles, and O is present mainly on the surface of the columnar crystal particles.

On the other hand, the second layer is usually composed of columnar crystal particles which are substantially parallel (i.e. within ±10°) to the normal line of the principal plane of the substrate. Each particle usually has a length corresponding to the thickness of the second layer, but it may not necessarily be fully grown to the thickness of the layer. Its diameter is usually from 50 to 500 A.

Like in the case of the above-mentioned first layer, Co, Ni, Cr, etc. are present in the crystal particles, and O is present mainly on the surface of the particles.

Such a second layer usually has a thickness of from 0.005 to 0.1 $\mu$m, preferably from 0.005 to 0.05 $\mu$m. If the thickness is less than 0.005 $\mu$m, no adequate corrosion resistance will be obtained, and if the thickness exceeds 0.1 $\mu$m, the electromagnetic conversion characteristics tend to be deteriorated.

Such a magnetic layer may be formed directly on the substrate or on an undercoating layer formed on the substrate.

The above-mentioned first layer is usually formed by an oblique vapor deposition method.

As the oblique vapor deposition method, a conventional method may be employed. The minimum value of the incident angle relative to the normal line of the principal plane of the substrate is preferably at least 30°.

With respect to the conditions for the vapor deposition and the method for after-treatment, conventional conditions and method, may be employed. As effective after-treatment, there are many conventional treating methods for the introduction of O into the magnetic layer.

On the other hand, the second layer is usually formed by sputtering or a so-called vertical vapor deposition method. In this case, the conditions for the formation may be selected from a wide range. Further, it is possible to apply various after-treatments for the introduction of O after the formation of the second layer.

The substrate to be used is not critical. However, a flexible substrate, particularly a substrate made of a resin such as polyester or polyimide, is preferred.

The substrate may have various thickness. However, it is usually preferred that the thickness is from 5 to 20 $\mu$m.

The RMS value of the height of the surface roughness of the rear surface opposite to the magnetic layer-forming surface of the substrate is preferably at least 0.05 $\mu$m, whereby the electromagnetic conversion characteristics will be improved.

To the magnetic recording medium of the present invention having the above-mentioned construction, a top layer made of various organic and inorganic materials may be formed on the magnetic layer, as the case requires.

The magnetic recording medium of the present invention is useful as a magnetic recording medium for video or audio recording tapes.

According to the present invention, the corrosion resistance such as acid resistance or moisture resistance is substantially improved. This improvement appears critically when the density of the surface layer corresponding to $\frac{1}{4}$ of the magnetic layer becomes greater by 20% than the density of other portions.

According to the present invention, there will be no substantial deterioration of the electromagnetic conversion characteristics, and the output and S/N ratio will be high.

Further, the running friction is low, and the running durability is high.

Now, the present invention will be described in further detail with reference to Examples. However, it should be understood that the present inventon is by no means restricted by these specific Examples.

EXAMPLE 1

A magnetic layer having a thickness of 0.1 $\mu$m was formed on a polyethyleneterephthalate (PET) film having a thickness of 10 $\mu$m by an oblique vapor deposition method with use of an alloy having a weight ratio of Co/Ni being 4. In the oblique vapor deposition method, the incident angle was 50°, and the vapor deposition atmosphere was such that $P_{Ar}=2\times10^{-2}$ Pa, and $P_{O2}=1\times10^{-2}$ Pa.

In the magnetic layer thus obtained, Co/Ni=4 (weight ratio), O/Co+Ni)=0.02 (atomic ratio). The magnetic layer was composed of columnar crystal particles fully grown to the thickness of the layer at an angle of about 40° relative to the normal line of the principal plane of the substrate and having a short diameter of about 0.01 $\mu$m. Further, from the Auger spectroscopic analysis under ion milling, the magnetic layer was found to have a profile such that Co was less in the vicinity of the surface, and the signal attributable to O showed a chemical shift and O was concentrated in the vicinity of the surface. O was found to be present on the surface of the columnar particles in such a form as bound to the metal.

The sample thus obtained is designated as A0.

Then, a second magnetic layer was formed on the magnetic layer A0 by RF sputtering with use of the above-mentioned Co-Ni alloy, whereby Sample A1 was obtained. The sputtering was conducted in an atmosphere of $P_{Ar}=1\times10^{-}$ Pa and $P_{O2}=1\times10^{-1}$ Pa.

The second layer had the same composition as the above first layer. The second layer was composed of columnar particles which are fully grown to the thickness of the layer substantially in parallel with the normal line of the principal plane of the substrate and which had a short diameter of 0.01 $\mu$m. Co and Ni were present in the particles, and O was present on the surface of the particles.

With respect to Samples A0 and A1 thus obtained, the changes of the count numbers of Co and Ni were measured by a fluorescent X-ray, while etching the Samples by ion milling by means of $Ar^+$, and the ratio of the count numbers as between the surface portion corresponding to a ¼ thickness of the total magnetic layer and the other portions, i.e. the ratio of the densities, was obtained.

The results are shown in Table 1.

Further, each Sample was left to stand at 60° C. under relative humidity of 90% for seven days, whereupon the change of the magnetic flux $\Delta\phi m$ per 1 $cm^2$ of the Sample was measured.

The results thereby obtained are shown in Table 1.

TABLE 1

| Samples | A0 | A1 |
| --- | --- | --- |
| Ratio of the densities | 0.9 | 1.4 |
| $\Delta\phi m$ (%) | 18 | 10 |

From the results shown in Table 1, the effectiveness of the present invention is evident.

EXAMPLE 2

A first layer was formed in the same manner as in Example 1 except that the composition of Sample A0 was changed to Co/Ni/Cr=85/10/5. This first layer is designated as Sample B0. The ratio of O/(Co+Ni+Cr) was 0.02.

Then, a second layer having the same composition was formed on this first layer by RF sputtering in the same manner as in the case of Sample A1. This second layer is designated as Sample B1.

The results thereby obtained are shown in Table 2.

TABLE 2

| Samples | B0 | B1 |
| --- | --- | --- |
| Ratio of the densities | 0.9 | 1.3 |
| $\Delta\phi m$ (%) | 16 | 5 |

From the results shown in Table 2, the effectiveness of the present invention is evident.

What is claimed is:

1. A magnetic recording medium which comprises a magnetic layer formed on a substrate and comprising Co, or Co and one to three elements selected from the group consisting of Ni, Cr and O, wherein, when the magnetic layer is divided equally into four portions in the direction of the thickness of the magnetic layer, the density of the portion located farthest from the substrate is greater by at least 20% than the average density of three other portions.

2. The magnetic recording medium according to claim 1, wherein the magnetic layer contains Ni, and the weight ratio of Co/Ni is at least 1.5.

3. The magnetic recording medium according to claim 1, wherein the magnetic layer contains Cr, and the weight ratio of Cr/(Co or Co+Ni) is from 0.001 to 0.1.

4. The magnetic recording medium according to claim 1, wherein the magnetic layer contains O, and the atomic ratio of O/(Co or Co+Ni) is at most 0.1.

5. The magnetic recording medium according to claim 1, wherein the magnetic layer has a thickness of from 0.05 to 0.5 μm.

6. The magnetic recording medium according to claim 1, wherein the magnetic layer comprises a first layer located adjacent to the substrate and composed of columnar crystal particles which are inclined relative to the normal line of the principal plane of the substrate and a second layer located on the first layer and composed of crystal particles which are not inclined relative to the normal line of the principal plane of the substrate.

7. The magnetic recording medium according to claim 6, wherein the second layer has a thickness of from 0.005 to 0.1 μm.

* * * * *